Patented Dec. 27, 1932

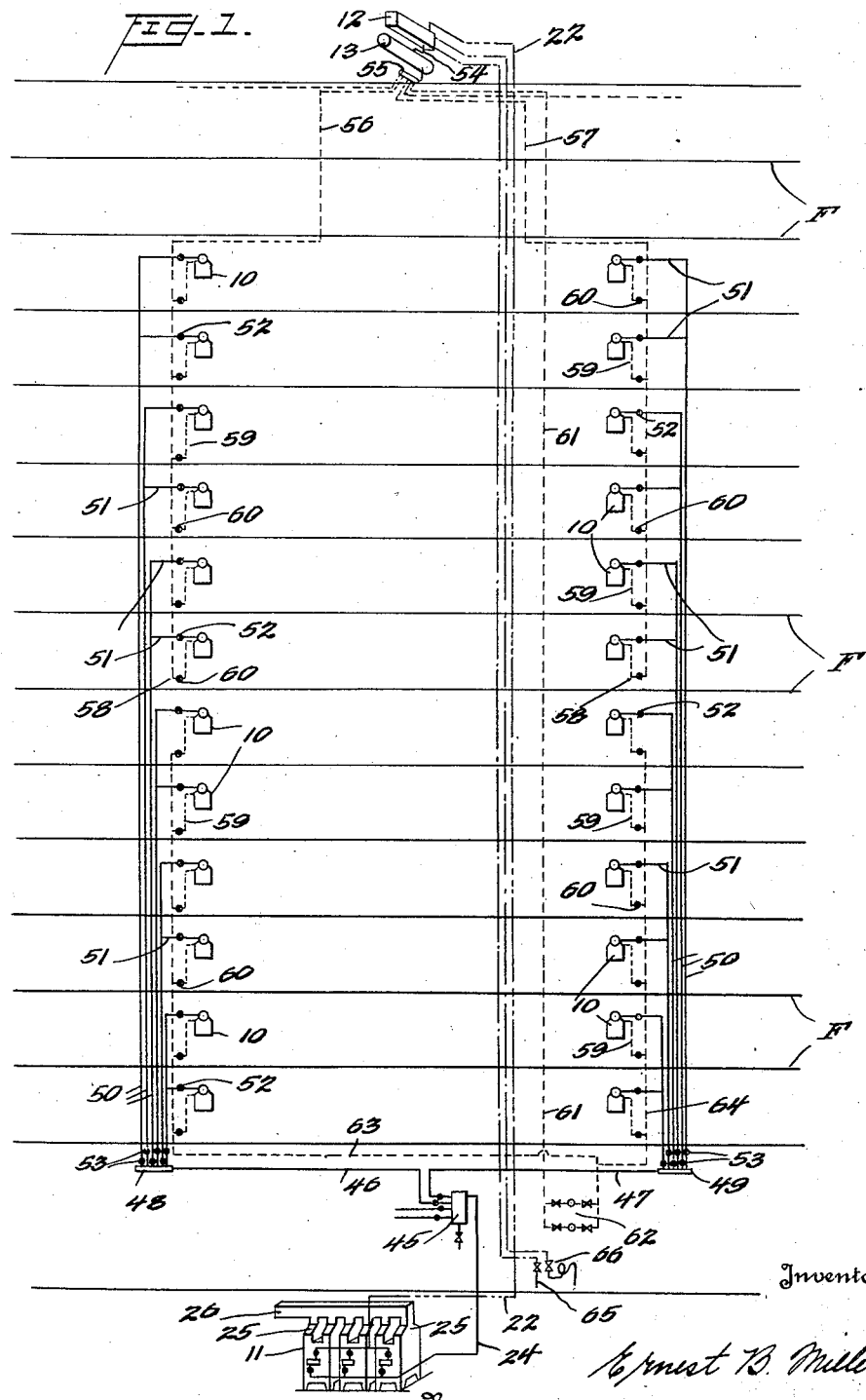

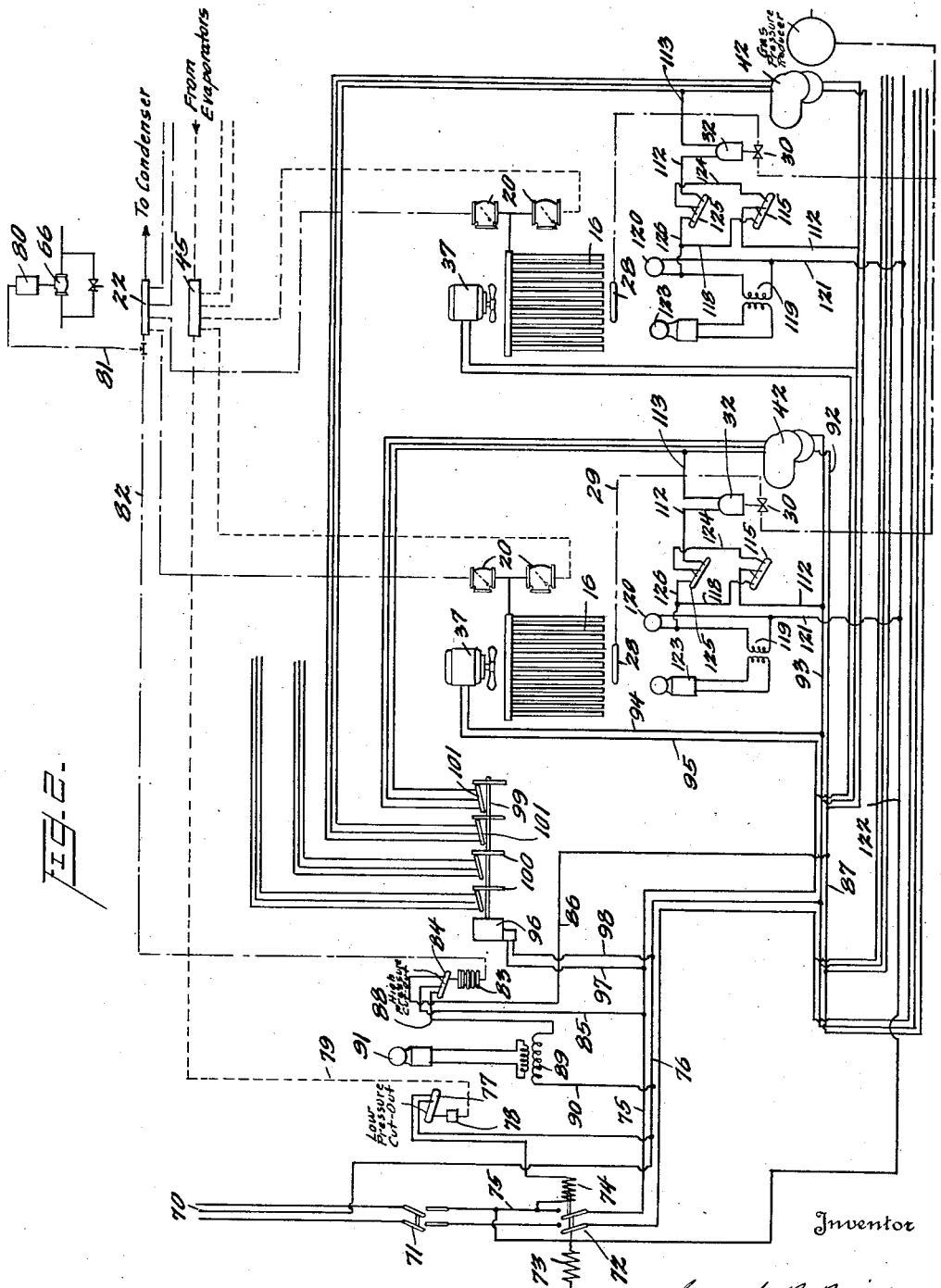

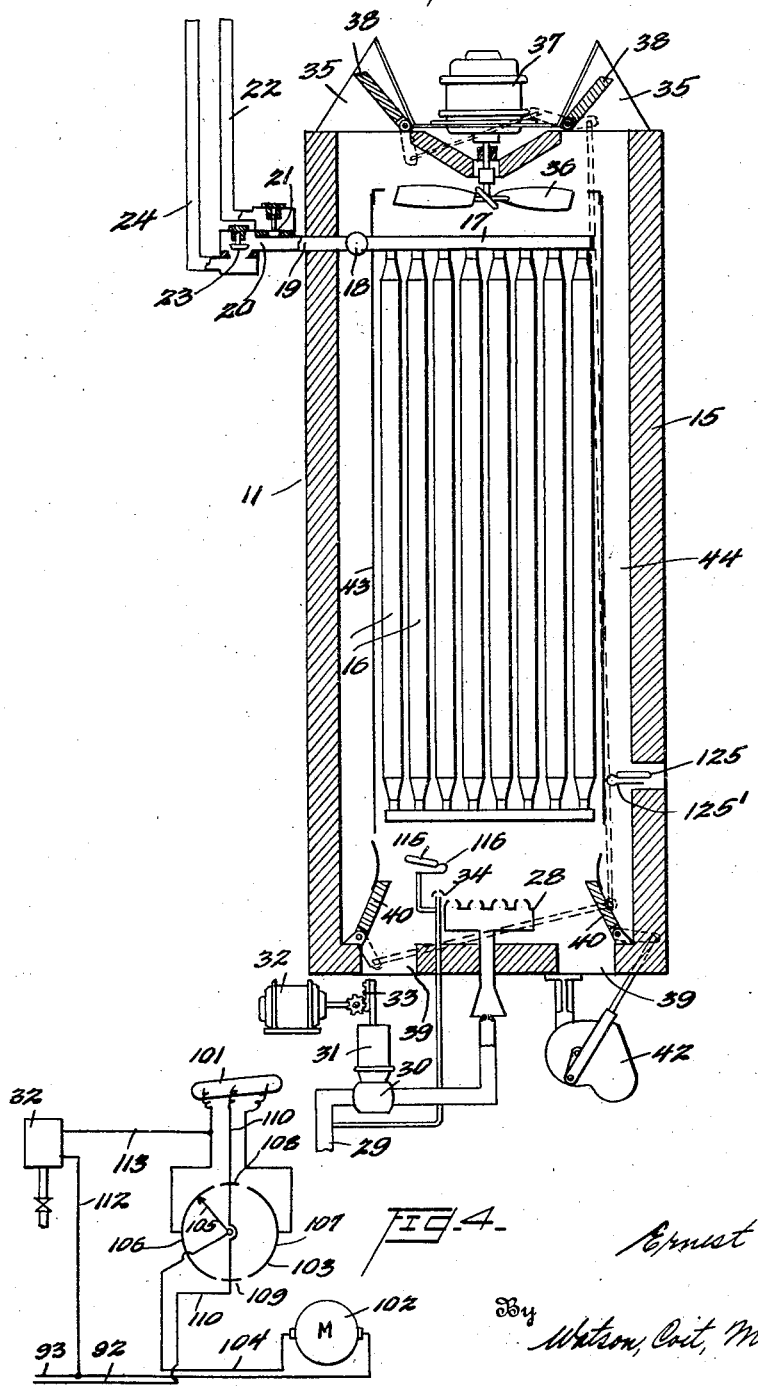

1,892,407

UNITED STATES PATENT OFFICE

ERNEST B. MILLER, OF BALTIMORE, MARYLAND, ASSIGNOR TO THE SILICA GEL CORPORATION, OF BALTIMORE, MARYLAND, A CORPORATION OF MARYLAND

REFRIGERATION SYSTEM

Application filed October 10, 1929. Serial No. 398,774.

This invention relates to refrigeration apparatus and more particularly to a multiple unit refrigeration system.

It is a general object of the present invention to provide a novel and improved refrigeration system of the type wherein one or more adsorption units function to cool one or more evaporators arranged in compartments which are to be cooled.

Among the important, novel features of the invention may be particularly enumerated the following:

(a) The method and apparatus for ganging and automatically controlling a plurality of adsorption refrigeration units.

(b) The system of distributing the condensed refrigerant to a plurality of evaporators at different vertical heights whereby the pressure in the lowermost evaporators is less than that resulting from the static head of the liquid plus the condenser pressure.

(c) Automatic control of the quantity of condenser water in accordance with the pressure in the condenser.

(d) Automatic control of operation of the activating mechanism for the adsorbers in accordance with pressure in the condenser.

(e) The arrangement of various automatic safety devices for the control of operation of the heating and cooling equipment.

Other and further objects and features of novelty will become apparent to those skilled in the art as the description proceeds. For a full understanding of the invention reference should be had to the following specification and the accompanying drawings disclosing a single exemplary embodiment thereof with the understanding that such changes may be made therein as fall within the scope of the appended claims without departing from the spirit of the invention.

In said drawings:

Figure 1 is a schematic and diagrammatic illustration of a multiple unit refrigeration system constructed according to the present invention;

Figure 2 is a piping and wiring diagram of the various refrigeration devices and control units;

Figure 3 is a diagrammatic vertical section through an adsorber unit and its accessories; and Figure 4 is a wiring diagram of the gas and damper control mechanism of an adsorber unit.

The present invention has for its main purpose the provision of an extremely flexible refrigeration system of the adsorption type, by which is meant, a system which can be readily expanded by the addition of evaporating units, adsorbing units, or both in accordance with demand and in which these units installed can be selectively cut out where they are temporarily unnecessary. By this arrangement any desired size of system, within reason, can be built up from the same type units, thus materially reducing the cost. A system of this type is of especial advantage where, for instance, it is desired to build a large apartment house and equip all the apartments, or only those of the tenants desiring them, with automatic refrigeration. With this system any number of evaporators or cooling units for the refrigerators may be used and the adsorption capacity can be adjusted to the number of evaporators by combining standard single adsorber units.

The invention is shown in its broadest aspect in Figure 1 where the horizontal lines F represent floors for instance, of an apartment house, each of which floors may have a plurality of apartments thereon, of which but two are indicated in the drawings. It is assumed that each apartment is provided with a refrigerator (not shown) which it is desired to cool automatically. For this purpose each refrigerator is provided with an evaporator or cooling unit 10. These evaporators are adapted to be connected by suitable piping with an adsorber generally indicated by the reference character 11 and preferably arranged in one of the basements of the building. This adsorber is shown as comprised here of three identical adsorber units ganged together to make up sufficient capacity for the number of evaporators used. Each adsorber is provided with means for activating the adsorbent therein, when saturated, which results in driving off the refrigerant in vapor form and passing it to the condenser 12 where it is liquefied as the result of pressure and cooling, preferably by water. The liquid refrigerant is delivered by gravity to a receiver 13 from whence it is distributed by gravity to the various evaporators. It will be understood that the cooling results from the evaporation of the liquid refrigerant in the evaporators by the adsorption of the vapor thereof by the adsorbent which reduces the pressure above the liquid to enhance the rate of evaporation.

The system is susceptible to development into any size required by the addition of evaporators, and the provision of suitable adsorption units. In Figure 1 the arrangement is such that there are two evaporators, 10, on each floor and those on successive floors are in tiers for convenience in piping. It will be seen that piping is shown for connection to additional tiers if required.

The evaporators 10 are of standard construction and function in what is known as a flooded condition, that is, each is provided with a plurality of coils or other large surface containers for the refrigerant liquid, which are dependent from a tank having a float which controls a valve to permit the entrance of liquid to maintain the coils substantially filled with it. This form of evaporator is well known and needs no further description.

The condenser 12 is of the standard, double pipe type, cooled by water and is preferably arranged in the attic or beneath the roof of the building. It is shown but diagrammatically at 12 since its construction is well known. It need be supplied with but two water pipes, one to supply cold water and one for discharge; and with a vapor delivery pipe from the adsorption units and a liquid return pipe which leads to the receiver 13 which is merely a closed tank to maintain a reserve of liquid refrigerant available for the evaporators as required.

The adsorber 11 as previously stated is composed of the required number of adsorber units of which one is shown diagrammatically in Figure 3. This representative unit comprises a substantially rectangular vertical casing 15 of heat insulating material in which is arranged and supported a group of vertical tubes 16 formed of metal and each filled with a suitable dry, pulverulent adsorbent such for instance as silica gel. These tubes are connected together in rows to the top subheaders 17 which in turn are all connected to the main transverse header 18 which connects by means of a pipe 19 to a valve manifold assembly 20 containing two check valves, the one 21 opening when pressure in the adsorber is greater than in the pipe 22 and the other 23 opening when pressure in the pipe 24 is greater than that in the adsorber. The pipe 22 leads to the condenser and the pipe 24 leads from the evaporators from which the adsorber takes cold vapor which fills the pores of the adsorbent. Upon saturation of the adsorbent it is heated and the vapor driven off and passed up the pipe 22 to the condenser where it is liquefied in the well known manner.

For heating purposes a gas burner 28 has been shown in the bottom of the casing 15 supplied with gas from the pipe 29 through a valve 30 normally held closed by a spring in the casing 31 and opened by means of the motor 32 whose pinion acts on a rack 33 on the valve stem. When current is supplied to the motor the valve is opened and the motor stalls upon the complete opening of the valve while the current remains on. When the current is turned off the motor is reversed by means of the spring and the valve closed. A pilot burner 34 always remains burning to ignite the gas at the main burner when it is turned on.

Heated air passes up over the tubes 16 and is blown out through the ports 35 by means of the fan 36 driven by the motor 37. In the complete installation these ports 35 are connected by hoods 25 to the manifold flue 26 to carry away the heat and cooling air. The ports 35 can be closed by dampers 38. Lower ports 39 for the admission of air are provided and can be closed by dampers 40. The dampers are all connected together by the linkage shown so that they operate in unison under the control of the half revolution motor 42. This motor is built so that when current is supplied to it, the drive shaft rotates a half revolution and automatically stops and upon the next application of current makes another half revolution. When the gas is burning the dampers are closed and the heated air from the burner passes over the tubes 16 which are housed in by the secondary casing 43, and by the action of the fan this heated air is then passed down the passages 44 between the secondary casing 43 and the main casing 15 and again passes over the burner for recirculation. Small ports, not shown, are provided for supplying additional fresh air to support combustion and for the escape of the waste products of combustion. At the end of the activation period the burner is turned off, the dampers are opened and the fan 36 draws cold air over the adsorber tubes to cool them. This cooling continues during adsorption to remove the heat of adsorption.

These adsorber units can be ganged by merely connecting their pipes 22 and 24 with suitable manifolds leading respectively to the evaporators and condensers and by providing means to control the flow of gas and the operation of the damper motors. When used in multiple at least one unit is on the adsorption phase and one on the activating phase at all times. The system for controlling the whole apparatus is best shown in Figure 2 but before describing that, reference will again be had to Figure 1 for the piping connections of the system.

The pipe 24 leads from the adsorber manifold to a manifold 45 from which branch pipes 46 and 47 lead. It will be seen that provision is made for other pipes from this manifold if required and that each pipe leading from the manifold is provided with a cut-off valve whereby whole banks of evaporators may be moved from the system when desired. Subheaders 48 and 49 respectively are connected to the pipes 46 and 47 and from these subheaders lead the vapor lines or risers 50 which are preferably arranged so that each line is connected by short pipe sections 51 to two evaporators 10 although of course more than two can if desired be so connected. A cut-off valve 52 is arranged in each pipe 51 so that the vapor line to each evaporator can be shut off for purpose of repairs. Furthermore, cut-off valves 53 are provided to cut off each riser 50 from the evaporators.

The heated vapor resulting from activation of any adsorber is driven off through pipe 22 which leads directly up into the top of the condenser. The heated vapor is cooled and finally liquefied in the condenser, discharging by means of the pipe 54 directly into the receiver 13 which delivers it to a distributing manifold 55.

One of the novel features of this invention resides in the manner of returning the liquid from the manifold 55 to the various evaporators. Obviously if the liquid were delivered directly to all of the evaporators the pressure in the lowermost ones would be equivalent to the sum of the condenser pressure and the static pressure resulting from the difference in level between those evaporators and the receiver. In Figure 1 which is representative of an actual installation this difference is more than 16 stories or about 175 feet which should result in a pressure of about 150 pounds per square inch where the liquid used is $SO_2$. This would require extra heavy piping and would impose undue burden on the joints and the float controlled valves in the evaporators.

According to the present system liquid is delivered directly from the manifold 55 to the evaporators on the upper six floors or just a sufficient number of floors to insure that the lowermost evaporator in this group does not have too great a pressure. The liquid lines 56 and 57 are shown for this purpose and it will be noted that they stop at the points 58 and each one is provided with a branch line 59 for each evaporator and in this branch line is arranged a cut-out valve 60 to assist in isolating each evaporator when necessary either for purposes of repair or to cut the evaporator out of the system if the apartment is vacant. A liquid line 61 runs from the manifold 55 to the basement where it is connected to a pressure reducing assembly 62 which reduces the pressure from the approximate 150 pounds to about 90 pounds, in the present system, which is the pressure necessary to deliver the liquid up to the evaporators next below those supplied directly from the receiver. From the pressure reducing assembly 62, pipes 63 and 64 lead upwardly and are provided as are the downwardly directed liquid return pipes with the short sections 59 connected to the evaporators.

Water for the condenser is delivered into the pipe 65 in the basement, passes upwardly through the condenser and is returned to the regulator 66 also in the basement which controls the rate of flow in accordance with the pressure of the condenser as will be later explained.

The piping is all of small size drawn copper tubing, some of standard wall and some of extra heavy wall and it will be seen that all piping originates in the basement where cut-off valves are provided for safety and ease of control. All controls, both automatic and manual are grouped close to the evaporators and if desired gauges for indicating the condition of the system can be applied to various of these pipes. A fusible plug is provided in the condenser system to vent the refrigerant in case of fire.

When operating a plurality of adsorber units in multiple, it is highly desirable that they be caused to function in succession. In this way, while certain of them are on the adsorption phase, others will be on the activation phase, and there will be continuous adsorption if necessary. This is done in accordance with the present invention by controlling the respective gas valves by means of a clock mechanism which closes them in succession at stated intervals.

In Figure 2 the whole automatic control system is shown with such parts of the adsorbers and piping as required. Only two adsorbers have been shown, but additional wiring and piping is indicated for two others, and it will be clear that as many can be connected to the system as desired. The apparatus requires for its operation, in addition to the gas already mentioned, a source of alternating current 70, preferably either three-phase or single-phase three-wire as shown in the present case. The two outer wires are controlled by means of a manual switch 71 and again by an automatic switch 72 normally held open by the spring 73 and closed by the magnet 74 when energized. Current is supplied to this magnet 74 from the outer conductor 75 and the neutral conductor 76 which by-passes both of the switches as shown. Energizing current for the magnet 74 is supplied through the low pressure cut-out switch 77. This conveniently comprises a mercury tube having a pair of contacts projecting through one end thereof and mounted for tilting so that the mercury is normally bridging the two contacts, but, when tilted, leaves the contacts and opens the circuit, permitting the switch 72 to snap open. This tilting bulb 77 is under the control of a sylphon bellows 78 which is connected by means of a pipe 79 to the manifold 45, and thus the bellows is subject to the pressure in the cold vapor lines. Thus the amount of refrigeration provided can be regulated, for the pressure in the vapor line varies directly with the temperature, and as the pressure goes down, indicating a low temperature, the bellows 78 collapses, and power is cut off from the whole system so that it remains at rest. Thus no activation takes place, and when those adsorbers which have been activated become saturated, no further refrigeration takes place until the temperature rises sufficiently to permit the closing of the switch 72 when the system will start up and begin activating. This so-called low pressure cut-out is therefore the temperature control.

The water supplied to the condenser is regulated in quantity, as previously described, in accordance with the condenser pressure. The higher the pressure, the more water is required for cooling. At the upper part of Figure 2 is seen the valve 66 which regulates the discharge of water from the condenser and which is under control of the bellows 80 connected by means of the pipe 81 to the hot vapor manifold 22 leading to the condenser. This manifold is in the basement with the valve 66, and pressure in this manifold is substantially the same as the condenser pressure so that accurate automatic regulation of the quantity of water is readily effected, thus insuring no waste of water.

A pipe 82 is likewise connected to the manifold 22 and leads to the bellows 83 which is expanded in case of excessive condenser pressure, which would be dangerous. When this bellows 83 expands, it tilts the three-contact mercury bulb 84, the middle contact of which is connected by the wire 85 to the outside conductor 75. The terminal in the end of the bulb normally down is connected by means of the conductor 86 to the conductor 87 which, as will be later described, supplies current to the damper motors and the gas valves. If the mercury is caused to run away from the contact connected to the wire 86, the wire 87 is thus de-energized and the gas valves allowed to close, thus insuring against further activation so that no increase in pressure in the condenser can be effected. The tilting of the bulb 84 causes the mercury to connect the center contact to the contact at the far end of the bulb which is connected by means of the wire 88 to the primary 89 of a transformer, the other terminal of which is connected by means of the wire 90 to the neutral conductor 76. The secondary of the transformer is thus energized when the bulb is tilted to the left, and causes the bell 91 to ring, warning the attendant of the unsafe condition so that the cause of the trouble can be found. The two safety devices just described, as well as the water regulator, will be seen to be common to all of the adsorbers.

Considering now the wiring for each adsorber, it will be seen that the conductor 87 is branched to provide the conductor 92 also directly connected through the high pressure cut-out with the outside conductor 75. The neutral conductor 76 is branched to provide a conductor 93. These two conductors 92 and 93 provide current for the damper motor 42, the gas valve motor 32, and the two safety devices on the adsorber unit. The branch 94 from the conductor connected to the neutral leads up to the fan motor 37, and a direct conductor 95 from the outside conductor 75 provides the complete circuit for the fan motor which will thus be seen to be connected directly to the power supply under the control of only the switch 72. Thus it can be seen that the high pressure cut-out has no effect on stopping or starting the motors 37 which will thus run at all times except when the low pressure cut-out shuts off the whole system. By stopping these motors when the low pressure cut-out functions, adsorption is immediately reduced because the adsorption is much less effective as the temperature goes up, and it does this automatically by the heat of adsorption. Thus the arrangement automatically provides against excessive cooling.

An electric motor driven clock 96 is provided for timing the activation periods and for insuring successive operation of the adsorbers. This clock is connected by means of the conductors 97 and 98 directly to the outside conductor 75 and to the neutral conductor 76 so that the clock is under the same control as the motors 37 and stops only when the low pressure cut-out functions. It is provided with a shaft 99 provided with a cam 100 for each adsorber unit. The cams have their corresponding operating lobes spaced about the shaft $\frac{360}{cn}$ degrees apart where $c$ represents the number of cycles per 24 hours and $n$ represents the number of adsorber units, and the clock is preferably timed to run so that each unit normally makes 14 complete cycles in 24 hours. Each cycle is divided into 38 minutes for activation and 65 minutes for adsorption. The cycle changes on the units are in regular succession as already described, and it is impossible for them to get out of step. Each cam 100 operates to tilt a mercury bulb 101 which has a center contact and two end contacts so arranged that when the bulb is tilted in one direction by the cam, the center contact and one end contact are connected by the mercury, and when tilted in the other direction, the center contact and the other end contact are connected by the mercury. The cams 100 are so shaped that the bulb is tilted to one direction for 38 minutes and to the other for 65, since it is these bulbs which control the time of activation and adsorption for their respective adsorber units.

Refer now to Figure 4 for a diagram on an enlarged scale of the damper motor and the gas valve motor as well as the control bulb. The conductors 92 and 93 previously referred to are shown, and the half-revolution damper motor 42 has been shown divided into its component parts, the actual motor 102 and the automatic switch 103 driven by it. It will be seen that the conductor 93 leads to one brush of the motor, and from the other brush the conductor 104 leads to the moving arm 105 of the switch. The switch comprises the segments 106 and 107 connected, respectively, to the end terminals in the mercury bulb 101. These segments 106 and 107 are each slightly less than 180° in extent and are opposite each other. Interposed between their ends are the short segments 108 and 109 which are connected by means of the wire 110 to the center terminal in the mercury bulb, to each other, and to the conductor 92.

Assume now that the bulb is tilted to the direction shown in Figure 4 so that the mercury connects the left and center contacts in the bulb. Current then flows from the conductor 92 to conductor 110, thence to the center terminal of the bulb, then to the left end terminal and to the segment 106, thence to the moving arm 105 which is in contact with it, thence through the conductor 104 to the motor, and from the motor back to the conductor 93 completing the motor circuit. When the motor shaft driving the switch member 105 and the damper control has completed about a half-revolution, its momentum carries it over the gap between the segment 106 and the segment 108, and current is obtained from the segment 108 to drive the motor and moving arm across the gap between this segment and the segment 107. This segment 107 is not energized by reason of the position of the mercury bulb so that no further operation of the motor takes place until the bulb is tilted to the opposite side when the operation is repeated for another half-revolution. Thus it will be seen that the damper operating motor moves a half-revolution each time the mercury bulb 101 is tilted to its opposite direction, and this tilting is under the control of the clock motor 96.

When the mercury bulb 101 is tilted in such a direction as to cause the dampers to be closed, current is supplied to the motor 32 which opens the gas valve when energized. Figure 4 shows how this is effected. By means of the conductor 112, the motor 32 is directly connected to the conductor 93. It is connected to the conductor 92 when the bulb is tilted to the position shown in Figure 4 by way of the conductor 110, the center contact in the bulb, the left end contact in the bulb, and the conductor 113. When the bulb is tilted in the other direction, this circuit will be broken and the gas valve motor de-energized and the valve closed by its spring.

In Figure 2 the conductor 112 is shown as having interposed therein two three-contact mercury bulbs. The lowermost one is a pilot safety and is shown in Figure 3 at 115 mounted on a bi-metallic loop 116 directly over the pilot flame. If, for any reason, this flame should go out, the loop would contract, and the bulb would be given a tilt to the opposite direction from that shown. This would cause the conductor 112 passing in through the center contact of the bulb to be connected to the wire 118 leading to one side of the primary 119 of the transformer which has connected in parallel thereto the signal light 120. The other side of the signal light and transformer is connected by the wire 121 to the conductor 122 which leads to the outside conductor 75 ahead of the automatic switch 72. This tilting then of the bulb to the left will energize the transformer and light the light 120 as well as ring the bell 123, thus warning the attendant that something is wrong with the particular adsorber indicated by the light. When the bulb 115 is in the normal position, current from the conductor 112 passes to the right-hand contact therein and through the conductor 124 to the center contact of the high temperature safety control bulb 125, also shown in Figure 3, mounted on a bi-metallic loop 125' so that the heated gases pass over it. If these gases become too hot, the bulb 125 is tilted to the position opposite to that shown in Figure 2, and current from the center contact by way of the conductor 124 is led to the conductor 126 which is connected to the conductor 118 and operates the warning signals in the same manner. When in the normal position, the bulb 125 permits current to be conducted to the gas valve. Thus in case the pilot light goes out, the main gas valve is automatically disconnected from the circuit so that it cannot be turned on if the gas has no means for lighting it. Likewise if the temperature becomes too great for safety within the adsorber casing, the gas is shut off.

Each adsorber unit is provided with these two safety devices just explained as well as with the automatic gas valve and damper regulator, and since each unit is controlled by a cam on the clock shaft, it is seen that they can be made to work in any order desired by setting the cams.

It will be seen from the above description that the whole system is susceptible to any desired changes in size and arrangement and location of parts, and that it can be built up from standard units to any desired size, that it can be made to function as a whole or in part as required by conditions, that it is entirely automatic in operation and provided with such safety devices as to prevent any possible difficulty by absolutely shutting down those parts of the system which could cause it, that it automatically regulates the amount of refrigeration provided in accordance with that required, that it automatically regulates the amount of condenser cooling in accordance with that required, and further that it indicates by automatic signal apparatus the location of any faults so that they can be quickly found and corrected.

Having thus described the invention, what is claimed as new and desired to be secured by Letters Patent is:

1. In a refrigeration system, in combination, a plurality of individual evaporator units, a plurality of adsorber units each complete with activating equipment, manifolded vapor lines from said evaporators to said adsorber, a condenser connected to said adsorbers by a vapor line and to said evaporators by manifolded liquid lines, means to activate but one adsorber at a time and means to regulate the temperature of said evaporators by control of the adsorber on activation dependent on pressure in said manifolded vapor lines.

2. In a refrigeration system, in combination, a plurality of individual evaporator units, a plurality of adsorber units complete with activating equipment, manifolded vapor lines from said evaporators to said adsorbers, a condenser connected to said adsorbers by a vapor line and to said evaporators by manifolded liquid lines, means to activate but one adsorber at a time, means to regulate the temperature of said evaporators by control of the adsorber on activation dependent on pressure in said manifolded vapor lines and means to stop activation of the adsorber being activated upon occurrence of excess pressure in said condenser vapor line.

3. In a refrigeration system, in combination, a plurality of individual evaporator units, a plurality of adsorber units each complete with activating equipment, manifolded vapor lines from said evaporators to said adsorbers, a condenser connected to said adsorbers by a vapor line and to said evaporators by manifolded liquid lines, means to activate said adsorber singly in succession and means to stop activation of any adsorber upon reduction in vapor pressure in said manifolded vapor lines to a predetermined value.

4. In a refrigeration system, in combination, a plurality of evaporators arranged on the various floors of a building, a condenser above all of said evaporators, a direct pipe connection to return liquid from the condenser to the upper evaporators and extending down to where the static head of the liquid plus the condenser pressure is the maximum desired, means below all the evaporators and connected to the condenser to reduce the liquid pressure to that necessary to lift the liquid to the evaporators next below those fed by the direct pipe and a pipe connection between said means and said lower evaporators.

5. In a refrigeration system, in combination, a condenser, a pair of evaporators, one at such a height above the other that the pressure on the lower one would be excessive if directly connected to the upper one due to condenser pressure plus pressure of the column of liquid; a direct connection from the condenser to one evaporator, a connection from the condenser to the other evaporator and a pressure reducing device in said last mentioned connection.

6. In a refrigeration system for apartment buildings, in combination, an adsorber near the bottom of said building, a condenser near the top of said building, a plurality of evaporators intermediate the condenser and adsorber and connecting piping for said parts.

7. In a refrigeration system for a multi-storied building, in combination, an evaporator on each of a plurality of floors, a water cooled condenser at the top of said building, liquid refrigerant piping between said condenser and evaporators, an adsorber in the basement of said building, means to activate said adsorber, vapor piping connecting said adsorber and condenser and said adsorber and evaporators, a cold water pipe leading from the basement to the condenser, a hot water pipe leading from the condenser to the basement, a flow regulator in one of said water pipes and means to control said regulator in accordance with the pressure in the vapor pipe between said adsorber and said condenser.

8. In a refrigeration system, in combination, an evaporator, a condenser, an adsorber, piping connecting said units, heating means for said adsorber, a device to start and stop operation of said heating means, electric means to actuate said device, a source of current, a circuit connecting said source and electric means, a switch in said circuit actuated by pressure of vapor in the condenser, a signal device and means on said switch to connect said device to said source when the said circuit is interrupted by the switch.

9. In a refrigeration system, in combination, an evaporator, a condenser and a plurality of adsorbers; piping connecting said units into a refrigeration system, activating means for each adsorber, control means to successively operate said activating means, safety means on each adsorber to cut out its activator upon occurrence of predetermined conditions in that adsorber and safety means associated with the condenser to cut out all of said activators.

10. In a refrigeration system, in combination, an evaporator, a condenser and a plurality of adsorbers; piping connecting said units into a refrigeration system, activating means for each adsorber, control means to successively operate said activating means, safety means on each adsorber to cut out its activator upon occurrence of predetermined conditions in that adsorber and control means associated with the evaporator to cut out all of the said activators.

11. In a refrigeration system, in combination, a plurality of evaporators, a condenser, a plurality of adsorbers connected in parallel, a cold vapor line from the adsorbers to the evaporators, a hot vapor line from the adsorbers to the condenser, a separate heater for each adsorber, a control for each heater, a timing device adapted to successively operate each control to actuate the heaters to activate the adsorbers, an air circulating device for each adsorber normally operated continuously, and means actuated by change of pressure in said cold vapor line to actuate each operative control to shut off the heaters and to shut off said air circulating devices.

12. In a refrigeration system, in combination, a plurality of evaporators, a condenser, a plurality of adsorbers connected in parallel, a cold vapor line from the adsorbers to the evaporators, a hot vapor line from the adsorbers to the condenser, a separate heater for each adsorber, a control for each heater, a timing device adapted to successively operate each control to actuate the heaters to activate the adsorbers, an air circulating device for each adsorber normally operated continuously, and means actuated by change of pressure in said cold vapor line to actuate each operative control to shut off the heaters and to shut off said air circulating devices said means also stopping said timing devices.

13. In a refrigeration system, in combination, a plurality of evaporators, a condenser, a plurality of adsorbers connected in parallel, a cold vapor line from the adsorbers to the evaporators, a hot vapor line from the adsorbers to the condenser, a separate heater for each adsorber, a control for each heater, a timing device adapted to successively operate each control to actuate the heaters to activate the adsorbers, an air circulating device for each adsorber normally operated continuously, and means actuated by change of pressure in said hot vapor line to actuate each operative control to shut off the heaters only.

14. In a refrigeration system, in combination, an evaporator, a condenser, a plurality of adsorber units connected in parallel, a cold vapor line from the adsorbers to the evaporator, a hot vapor line from the adsorbers to the condenser, a casing surrounding each adsorber, a burner in each casing, dampers to close each casing when the burner is operating and vice versa, shut-off means for each burner, operating mechanism for each set of dampers, a source of electric current for said shut-off means and damper operating mechanism, timing means operated from said source of current to successively turn on said burners for periodic operation and to correspondingly control said dampers and safety means associated with said condenser to shut-off any burners which may be operating, without opening their dampers.

15. In a refrigeration system, in combination, an evaporator, a condenser, a plurality of adsorber units connected in parallel, a cold vapor line from the adsorbers to the evaporators, a hot vapor line from the adsorbers to the condenser, a casing surrounding each adsorber, a burner in each casing, dampers to close each casing when the burner is operating and vice versa, shut-off means for each burner, operating mechanism for each set of dampers, a source of electric current for said shut-off means and damper operating mechanism, timing means operated from said source of current to successively turn on said burners for periodic operation and to correspondingly control said dampers and means associated with said evaporator to shut off any burners which may be operating, without opening their dampers.

16. In a refrigeration system, in combination, an evaporator, a condenser, a plurality of adsorber units connected in parallel, a cold vapor line from the adsorbers to the evaporator, a hot vapor line from the adsorbers to the condenser, a casing surrounding each adsorber, a burner in each casing, dampers to close each casing when the burner is operating and vice versa, shut-off means for each burner, operating mechanism for each set of dampers, a motor driven air circulating fan for each casing, a source of electric current for said shut-off means said fan motors and damper operating mechanism, timing means operated from said source of current to successively turn on said burners for periodic operation and to correspondingly control said dampers and safety means associated with said condenser to shut off any burners which may be operating, without opening their dampers or stopping the fan motors.

17. In a refrigeration system, in combination, an evaporator, a condenser, a plurality of adsorber units connected in parallel, a cold vapor line from the adsorbers to the evaporator, a hot vapor line from the adsorbers to the condenser, a casing surrounding each adsorber, a burner in each casing, dampers to close each casing when the burner is operating and vice versa, shut-off means for each burner, operating mechanism for each set of dampers, a motor driven air circulating fan for each casing, a source of electric current for said shut-off means, said fan motors and damper operating mechanism, timing means operated from said source of current to successively turn on said burners for periodic operation and to correspondingly control said dampers, and means associated with said evaporator to shut off any burners which may be operating and their fan motors without opening their dampers.

18. In a refrigeration system, in combination, an evaporator, a condenser, an adsorber, piping connections for said units, heating means for said adsorber, electric control means for said heating means, a timing device to actuate said control means to start and stop operation of said heating means at definite recurring intervals, a source of current, a circuit connecting said source and said electric control means and a switch in said circuit actuated by the pressure of vapor in the condenser.

In testimony whereof I hereunto affix my signature.

ERNEST BALDWIN MILLER.